(12) United States Patent
McKinley et al.

(10) Patent No.: US 9,497,489 B2
(45) Date of Patent: Nov. 15, 2016

(54) SYSTEM AND METHOD FOR STREAM FAULT TOLERANCE THROUGH USAGE BASED DUPLICATION AND SHADOW SESSIONS

(71) Applicant: GOOGLE TECHNOLOGY HOLDINGS LLC, Mountain View, CA (US)

(72) Inventors: Brittain S. McKinley, Groton, MA (US); Sathyam Ganesan, Holden, MA (US); Yaron Eli Presente, Binyamina (IL); Brian J. Tarbox, Littleton, MA (US)

(73) Assignee: Google Technology Holdings LLC, Mountain View, CA (US)

(*) Notice: Subject to any disclaimer, the term of this patent is extended or adjusted under 35 U.S.C. 154(b) by 0 days.

(21) Appl. No.: 14/037,943

(22) Filed: Sep. 26, 2013

(65) Prior Publication Data

US 2014/0282770 A1    Sep. 18, 2014

Related U.S. Application Data

(60) Provisional application No. 61/776,983, filed on Mar. 12, 2013.

(51) Int. Cl.
| | |
|---|---|
| *H04N 21/231* | (2011.01) |
| *H04N 21/24* | (2011.01) |
| *H04N 21/2225* | (2011.01) |
| *H04N 21/242* | (2011.01) |

(52) U.S. Cl.
CPC .... *H04N 21/23116* (2013.01); *H04N 21/2225* (2013.01); *H04N 21/23103* (2013.01); *H04N 21/2401* (2013.01); *H04N 21/2405* (2013.01); *H04N 21/2407* (2013.01); *H04N 21/242* (2013.01)

(58) Field of Classification Search
CPC .......... H04N 21/2181; H04N 21/23103; H04N 21/23116; H04N 21/2405; H04N 21/242
See application file for complete search history.

(56) References Cited

U.S. PATENT DOCUMENTS

| | | | |
|---|---|---|---|
| 5,815,662 | A | 9/1998 | Ong |
| 6,115,740 | A | 9/2000 | Mizutani |
| 6,542,967 | B1 | 4/2003 | Major |
| 7,318,107 | B1* | 1/2008 | Menon .................. 709/239 |
| 7,324,555 | B1 | 1/2008 | Chen et al. |
| 7,533,239 | B2 | 5/2009 | Gill et al. |
| 8,065,559 | B2 | 11/2011 | Kamath et al. |
| 8,073,922 | B2 | 12/2011 | Bates |
| 8,074,107 | B2 | 12/2011 | Sivasubramanian et al. |

(Continued)

*Primary Examiner* — Pinkal R Chokshi
(74) *Attorney, Agent, or Firm* — Fenwick & West LLP

(57) ABSTRACT

Embodiments of the present invention: provide, from a first VOD server having a first cache, a first media presentation to a first group of user devices and a second media presentation to a second group of user devices; provide, from a second VOD server having a second cache, a third content to a third group of user devices; measure a first popularity corresponding to the first media presentation and a second popularity corresponding to the second media presentation; store a copy of the first media presentation on the second cache based on the first popularity and the second popularity; determine when the first VOD server fails to continue to provide the first media presentation; and provide, from the second VOD server, the first media presentation to the first group of user devices, wherein the first cache has the first media presentation stored therein, and wherein the second cache has the second media presentation stored therein.

19 Claims, 10 Drawing Sheets

(56) References Cited

U.S. PATENT DOCUMENTS

| | | |
|---|---|---|
| 2002/0156980 A1 | 10/2002 | Rodriguez |
| 2003/0005457 A1 | 1/2003 | Faibish et al. |
| 2003/0121049 A1 | 6/2003 | Yurt et al. |
| 2004/0158863 A1 | 8/2004 | McLain |
| 2005/0262246 A1* | 11/2005 | Menon et al. ............. 709/226 |
| 2005/0267948 A1 | 12/2005 | McKinley et al. |
| 2006/0150212 A1* | 7/2006 | Magnussen et al. .......... 725/32 |
| 2006/0230170 A1 | 10/2006 | Chintala et al. |
| 2008/0059721 A1* | 3/2008 | Turner et al. ............. 711/154 |
| 2009/0198897 A1 | 8/2009 | Arimilli et al. |
| 2009/0254952 A1* | 10/2009 | Sridhar et al. ............ 725/92 |
| 2010/0106683 A1* | 4/2010 | Nomoto ........... H04N 21/23116 707/610 |
| 2011/0093905 A1* | 4/2011 | McKinley et al. ............ 725/92 |
| 2012/0084399 A1* | 4/2012 | Scharber et al. ............ 709/219 |
| 2012/0159558 A1 | 6/2012 | Whyte et al. |
| 2013/0212300 A1* | 8/2013 | Eggleston et al. ........... 709/245 |
| 2013/0332613 A1* | 12/2013 | Yevmenkin et al. ......... 709/226 |
| 2014/0108671 A1* | 4/2014 | Watson et al. ............. 709/231 |

* cited by examiner

SYSTEM AND METHOD FOR STREAM FAULT TOLERANCE THROUGH USAGE BASED DUPLICATION AND SHADOW SESSIONS

BACKGROUND

A Video-on-Demand (VOD) system delivers video content to a video device of a user (e.g., a cable subscriber) as a video data stream in response to the user requesting (e.g., via a user interface of the video device) the video content. An Audio-Video-on-Demand (AVOD) system is a VOD system that delivers audio content to a user's audio device as an audio data stream in response to the user requesting the audio content. The term VOD system as used herein includes both a VOD and AVOD system. Similarly, the term VOD server as used herein includes both a VOD server and an AVOD server.

Audio content and video content will be referred to collectively as "media content." For ease of reference, each television show, movie, song, advertisement, etc. will be referred to as a "media presentation." A "content stream" a progression of data, e.g., audio and video frames that originates from a source, such a from a VOD system, to a target, such as a television set-top box. A stream is first established, or set-up, by passing state information from the source to a user device. Such state information may include buffer locations, identifiers, logical portions source files, etc.

Also for ease of reference, each digital representation that is stored in memory and that represents a piece of a media presentation—i.e., each chunk of a television show, movie, commercial, song, game, or portion thereof—will be referred to as a "media file." It is to be understood, however, that there are many storage formats and data compression techniques for digitizing media content into media files, and that each media presentation may be stored as a single file, or as many files. Media files can be transferred from a memory of a source to a destination by way of a content stream.

A VOD server can be made from a cluster of servers, such as independent commercial off the shelf (COTS) based servers. VOD servers receive media content by one or more streams from a content provider. VOD servers often use cache storage (cache) that is distributed among the servers of the cluster to store media content, which can then be streamed (via one or more media streams) to a user's device. A VOD server can use a load balancing system to make efficient use of the cache. To accomplish this, the load balancing system places the media content on the caches of the various servers, and steers demand for the content as needed to get the best usage of the total available cache across all the servers. As a result, a VOD server may create multiple media streams, with different parts of the media content being streamed from multiple caches (and from multiple servers).

BRIEF SUMMARY OF THE DRAWINGS

The accompanying drawings, which are incorporated in and form a part of the specification, illustrate example embodiments and, together with the description, serve to explain the principles of the disclosure. In the drawings.

DESCRIPTION

Figure 1:
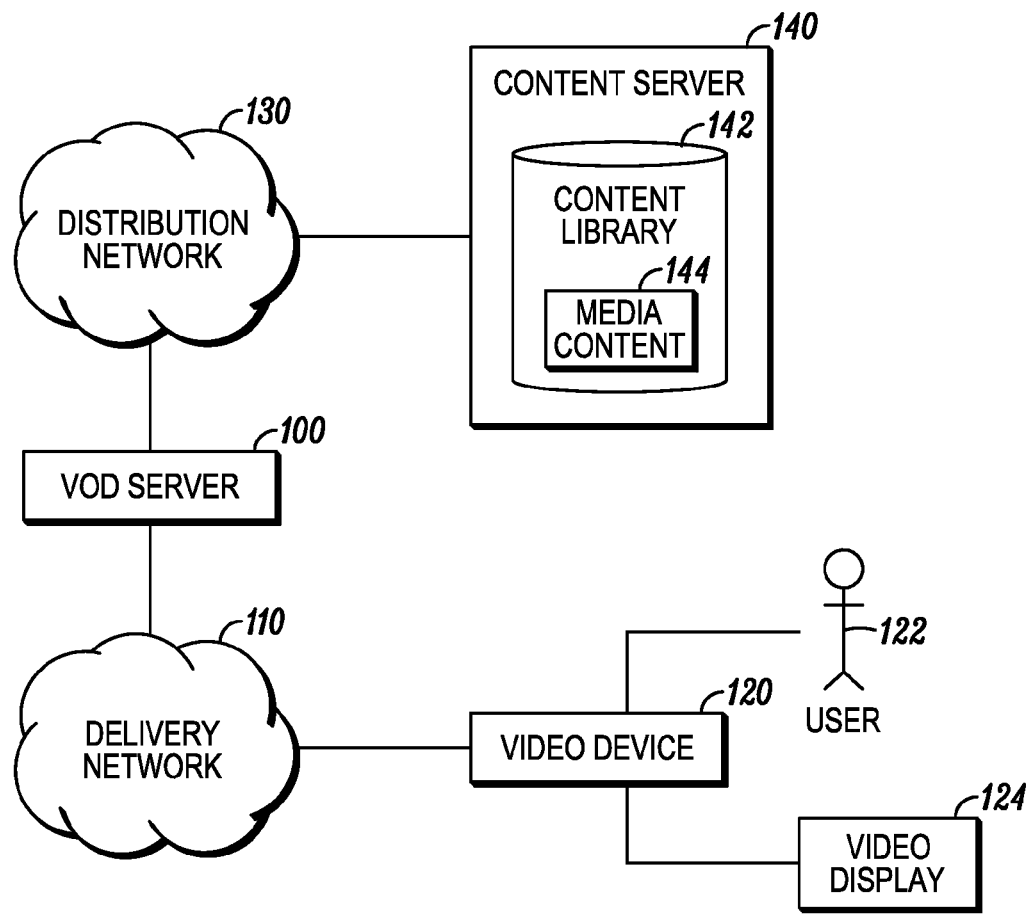
FIG. 1 illustrates a system that can determine popularity of content via hierarchical caching.

In accordance with the foregoing, various embodiments of a system and method for stream fault tolerance will now be described.

According to an embodiment, a VOD server delivers media content as one or more media streams to user devices such as a set-tops, computers, digital video recorders (DVRs), personal video recorders, or portable media players. Possible types of media content include movies, television shows, advertisements, and video games. The media content may be paid-for content, such as pay-per-view movies, rented content, or "free" content (e.g., media content included as part of a user's subscription package). Media content may be viewed instantaneously, or be downloaded to and stored on a DVR for future viewing.

In an embodiment, the VOD server caches media content across multiple servers. In other words, it stores frequently-accessed media content in relatively accessible temporary storage locations in one or more of the servers of the server cluster that makes up the VOD server. This helps to alleviate the time and expense of the VOD server repeatedly obtaining the media content from its original content provider. Possible types of memory that may be used for such temporary storage locations include Dynamic Random Access Memory (DRAM), Serial ATA (SATA), mass storage such as hard disk or optical disk, Small Computer System Interface (SCSI) disks, and non-volatile memory such as flash memory.

In an embodiment of the invention, the temporary storage locations that make up the cache are organized into a hierarchy having multiple layers. This technique will often be referred to as "hierarchical caching." Hierarchical caching allows the VOD server to balance storage and retrieval efficiency against bandwidth performance. Given a particular usage pattern of the users, the VOD server may store different video content on different types of storage devices. For example, the VOD server may store various media content based upon its popularity, with more popular media content being stored in faster memory (such as DRAM or flash memory) and less popular media content being stored in slower memory (such as on hard drives located at a central location on a network).

Similarly, the VOD server may stream media content according to its popularity. For example, the VOD system may stream the more popular content from faster memory, and the less popular content from slower memory. The more popular content also gets higher priority than less popular content when it comes to bandwidth. Thus, in some cases, the less popular content may only be streamed if the necessary bandwidth is available, and after bandwidth has been allocated to the higher priority media content.

In an embodiment of the invention, the VOD server determines which type of media content to store at each layer of the hierarchy, and appropriately determines amount and number of copies of the media content to store in each of those layers based on one or more factors, such as: (1) the size of the content library available to the system; (2) usage patterns of the users of the VOD server; and (3) characteristics of the memory type used at the layer. One or more of these factors may take precedence over other factors. For example, if the VOD server uses flash memory for the highest layer, the VOD server may try to minimize the number of memory writes that it makes to the flash memory to reduce the impact on the useful life of the flash memory. If the VOD system performs too many writes, the flash memory may fail. Thus, the VOD server could determine that, in spite of a movie having a high user demand, the flash memory should not be used to store the movie.

In some embodiments, the VOD server determines the popularity of media content dynamically, based on the current demand for the media content. For example, the VOD server may constantly determine the average number of requests for each movie in its library per hour and dynamically adjust their relative popularity metrics, and update their level in the hierarchy accordingly.

Referring to FIG. 1, a network according to an embodiment of the invention will now be described. A Video-on-Demand (VOD) server 100 communicates with a delivery network 110 and a distribution network 130. The delivery network 110 connects a user device 120 and video display 124 to the VOD server 100. The distribution network 130 connects a content server 140 to the distribution network 130. The content server 140 includes a memory on which a content library 142 is stored. The content library includes media content 144, including one or more media presentations.

A user 122 may view media content 144 on video display 124. In one embodiment, the user device 120 is a set-top box, or a device such as a digital video recorder (DVR), and the video display is a television set. The user device 120 and the video display 124 are representative only. There may, in fact, be many video devices in communication with the delivery network 110, each being connected to one or more video displays.

The content server 140 includes one or more elements of memory in which a content library 142 is stored. The content library 142 includes media files of movies, songs, television shows, games, etc. The distribution network 130 connects the content server 140 to the VOD server 100. In one embodiment, the content server 140 is a general-purpose server computer that supplies the media content 144 stored in the content library 142 to the VOD server 100. The media content is delivered to the VOD in one or more video streams. The distribution network 130 can connect a plurality of content servers 140 to the VOD server 100. Media content 144 may be digital copies of movies, television shows, advertisements, or any other type of media that a consumer may wish to purchase. Media content 144 may include any of those items singularly or multiple shows, movies, etc., as a group.

The delivery network 110 and the distribution network 130 shown in FIG. 1, in one embodiment, are public communication networks that connect the VOD server 100 to the user device 120 and to the content server 140. The present disclosure may also be implemented via the use of comparable network architectures. Comparable network architectures include the Public Switched Telephone Network (PSTN), a public packet-switched network carrying data and voice packets, a wireless network, and a private network. Non-limiting examples of a wireless network include a cellular network (e.g., a Time Division Multiple Access (TDMA), Code Division Multiple Access (CDMA), or Orthogonal Frequency Division Multiplexing (OFDM) network), a satellite network, and a wireless Local Area Network (LAN) (e.g., a wireless fidelity (Wi-Fi) network). A private network includes a LAN, a Personal Area Network (PAN) such as a Bluetooth network, a wireless LAN, a Virtual Private Network (VPN), an intranet, or an extranet. The system may additionally incorporate network architectures and protocols such as Ethernet, Token Ring, Systems Network Architecture, Internet Protocol, Transmission Control Protocol, User Datagram Protocol, Asynchronous Transfer Mode, and proprietary network protocols comparable to the Internet Protocol.

Figure 2A:
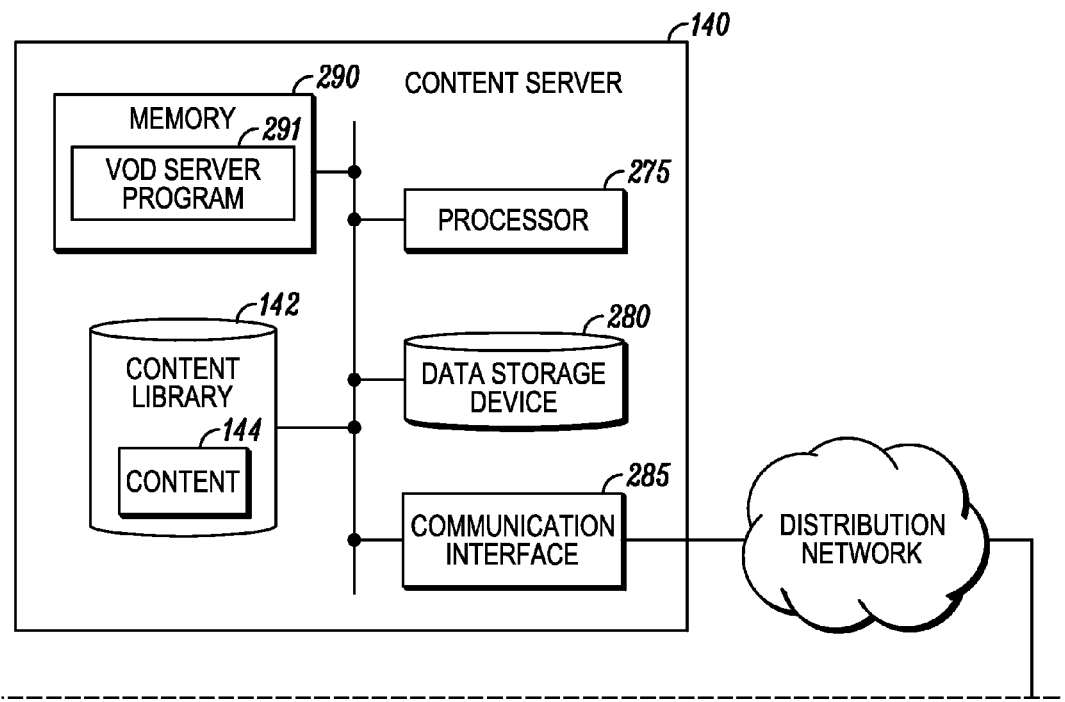
FIG. 2 is a block diagram that illustrates one embodiment of the hardware components shown in FIG. 1.
Figure 2B:
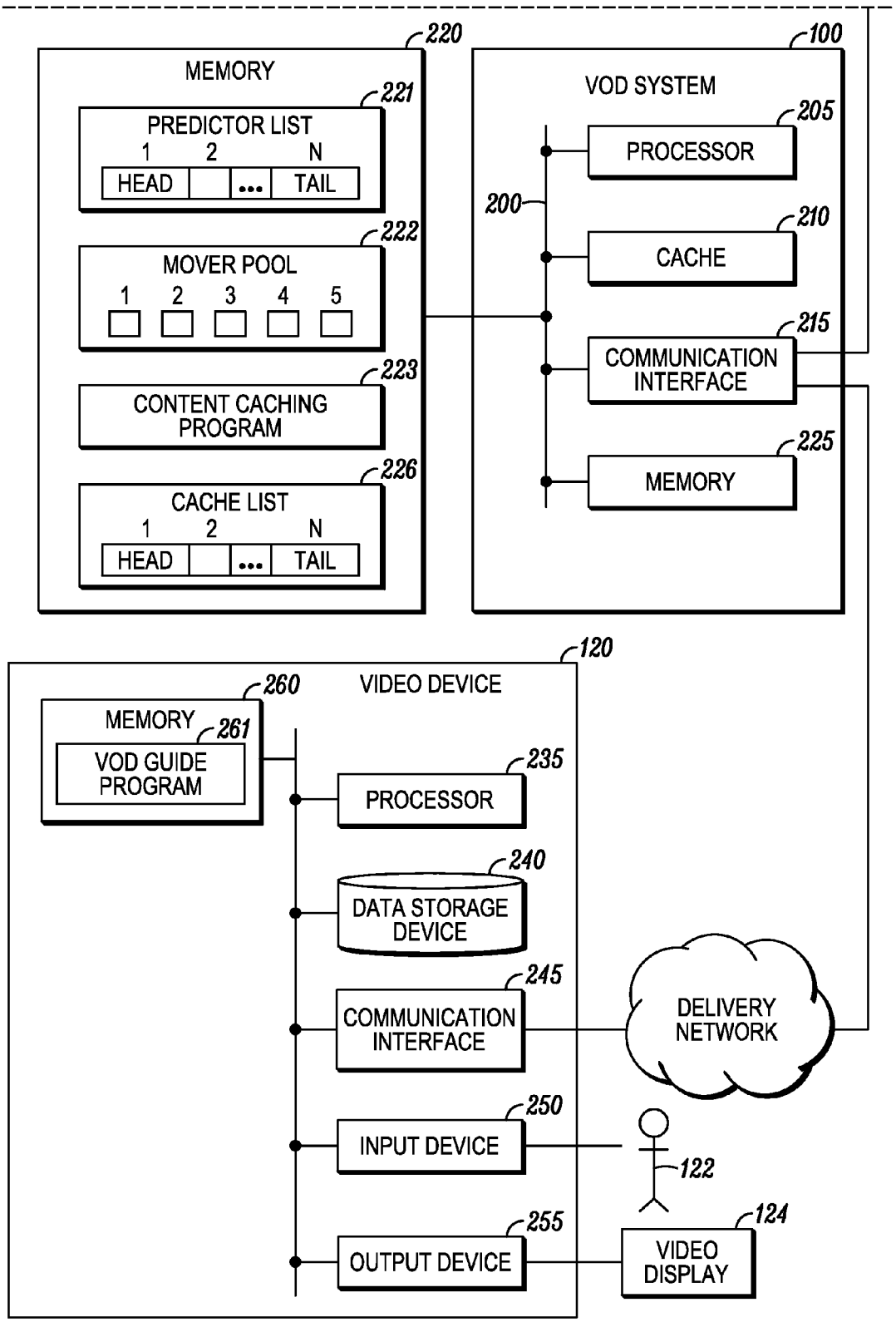

FIG. 2 is a block diagram that illustrates, in detail, one embodiment of the hardware components shown in FIG. 1. In particular, FIG. 2 illustrates the hardware components and software comprising the VOD server 100, user device 120, and content server 140.

The VOD server 100 shown in FIG. 2, in one embodiment, is a general-purpose computing device that performs hierarchical caching. The VOD server 100 includes a bus 200. The bus 200 is a communication medium that provides a data connection for a processor 205, cache 210 (such as a Serial ATA (SATA) hard disk drive, optical drive, Small Computer System Interface (SCSI) disk, or the like), communication interface 215 and memory 225. The memory 225 may be implemented with the same types of storage media as the cache 210. However, the cache 210 can be accessed more quickly than the memory 225, but may have less capacity. For example, the cache 210 may be 64 GB of flash memory, while the memory 210 is 2 TB of hard disk memory. The communication interface 215 transmits to and receives data from the VOD server 100 and the user device 120 via the delivery network 110, and between the VOD server 100 and the content server 140 via the distribution network 130.

Memory 220 (such as Random Access Memory (RAM), Dynamic RAM (DRAM), or the like), includes predictor list 221, mover pool 222, content caching media presentation 223 and cache list 226. Memory 220 communicates with VOD server 100 via bus 200. As shown in FIG. 2, memory 220 and VOD server 100 are shown as two separate devices, however they may also be a unitary device. In addition, while FIG. 2 illustrates a single memory 220 in communication with VOD server 100, many different memories with a structure similar to that of memory 220 may be in communication with VOD server 100 at the same time. Memory 220 may include operating system, administrative, and database media presentations that support the media presentations disclosed in this application.

The processor 205 executes the sequences of operational instructions that comprise each computer program resident in, or operative on, the memory 220. In another embodiment, not shown in FIG. 2, the cache list 226 is stored in the cache 210 of the VOD server 100. The content caching media presentation 223 may be executed on processor 205 and performs the hierarchical caching method disclosed in detail in FIG. 3. When the content caching media presentation 223 performs the hierarchical caching method, the results are stored in the memory 220 or cache 210.

In one embodiment the predictor list 221 is a least recently used (LRU) data structure having a number, N, of items, including a head item, and a tail item, ordered such that the most recently used item is at the top of the list. Each item in the list is a reference to a media presentation of media content 144. The number of items in the predictor list 221 is configurable and changes over time based on the current predictor age setting. When a user 122, by way of input device 250, purchases a media presentation of media content 144 that is not already in the predictor list 221, a buy count for the media presentation is set to an initial value. Over time, references in predictor list 221 are removed if a user 122, does not purchase the media presentation again within a defined time window of time. Thus, when a user 122, by way of input device 250, only purchases a media presentation once, any reference to the media presentation may eventually be removed from the predictor list 221, and the buy count set back to zero until the next purchase. The length of the defined time window is dynamically adjusted based on the oldest purchased time of any media presentation in cache list 226. For example, if the last time a media presentation was purchased was 12 hours from the current time, the defined time window may be adjusted based on those 12 hours. If the user 122, by way of input device 250, purchases the media presentation again, then the media presentation is moved to the head of the predictor list 221. When a user 122, by way of input device 250, stops the media presentation (i.e., by pressing the "stop" button on the remote control) thereby stopping the stream over which the media presentation is being delivered, the buy count is adjusted to only represent the percentage of the media presentation that the user 122 viewed, by way of video display 124. For example, if an hour-long media presentation was only viewed for 45 minutes then the buy count for that media presentation would be adjusted to 0.75.

Initially, each viewing of a media presentation is worth an initial buy count. When the stream is stopped, i.e., when the user 122 stops watching media presentation, the buy count is adjusted based on how long the user 122 actually watched media content 144. The initial buy count is configurable. In one embodiment, the initial buy count for a given media presentation is 0.5.

In one embodiment, the mover pool 222 includes a number, N, of elements. Each element is a reference to a media presentation of media content 144 waiting to be promoted to the cache 210. The number of elements in the mover pool 222 is configurable to limit the number of simultaneous elements moving into cache 210, in order to prevent the VOD server from being overloaded. As shown in FIG. 2, the mover pool 222 includes five (5) elements. When the VOD server 100 examines the buy count for a media presentation, and determines that the buy count exceeds a threshold, T, then the media presentation is deemed to be popular enough to have the media files that constitute the media presentation be moved into the cache 210. The VOD server 100 then moves the reference to media presentation to one of the mover pool 222 elements, if one element in the pool is available, to initiate the promotion of a media presentation from content server 140 to the cache 210. In one embodiment, the VOD server 100 concurrently moves the media presentation into the cache 210 and moves the reference to the media presentation to the mover pool 222 elements.

In one embodiment the cache list 226 is a least recently used (LRU) list having a number, N, of items, including a head item, and a tail item. The number of items in the cache list 226 changes over time based on the size of the media content 144—i.e., the aggregate amount of memory that the files making up the media presentations referenced by the cache list 226—and the configurable size limit of the cache 210. When a user, by way of input device 250, purchases a media presentation, the VOD server 100 records the time of the purchase and moves the reference to the media presentation to the head of the cache list 226. Therefore, the media presentation with the oldest purchase time will be at the tail of the cache list 226. The age of the oldest media presentation in the cache list 226 is used by content caching media presentation 223 to set the time to use for the predictor list 221 using a divider value, wherein predictor list 221 predicts the popularity of a media presentation.

For example, if the VOD system is using a divider value of 8, and the oldest media presentation in the cache was purchased 8 hours from the current time, then the predictor length would be set to 1 hour. As the age of the oldest media presentation gets shorter, the predictor window also gets shorter, thus having the effect of narrowing the time required for content to become popular enough to promote. During low usage times the window may widen allowing media presentation to become popular if it is purchased multiple times within the "age divided by divider" hours, but as the usage goes up, and the window narrows, it would take the same number of purchases in a shorter time to reach the same popularity. This feedback helps to smooth out promoting media presentations to the cache list 226 so that the promotions happen at a constant rate and are not all occurring during the usage peaks. This will be described in greater detail below with reference to FIG. 3.

The user device 120 shown in FIG. 2, in one embodiment, is a general-purpose device that displays video content. A bus 230 is a communication medium that provides a data connection for a processor 235, data storage device 240 (such as a Serial ATA (SATA) hard disk drive, optical drive, Small Computer System Interface (SCSI) disk, or the like), communication interface 245, input device 250 (such as a keyboard, keypad, touchscreen, television remote control, mobile telephone, or the like), output device 255 (such as a monitor, graphic display, television screen, media content playback device, or the like), and memory 260 (such as Random Access Memory (RAM), Dynamic RAM (DRAM), or the like). The communication interface 245 transmits and receives data between the user device 120 and the VOD server 100 via the delivery network 110.

The processor 235 executes the sequences of operational instructions that comprise each computer program resident in, or operative on, the memory 260. The reader should understand that the memory 260 may include operating system, administrative, and database programs that support the media presentations disclosed in this application. In one embodiment, the configuration of the memory 260 of the user device 120 includes a VOD guide program 261. The VOD guide program 261 communicates with the content caching program 223 on the VOD server 100 to perform the hierarchical caching method disclosed in detail in FIG. 3. The VOD guide program 261 allows the user 122, by way of input device 250, to select and request the media content 144 and displays the media content 144 on the video display 124. When the content caching program 223 performs the hierarchical caching method, results are stored in the memory 260 or data storage device 240. In another embodiment, the memory 260 may swap these programs, or portions thereof, in and out of the memory 260 as needed, and thus may include fewer than all of these programs at any one time.

The content server 140 shown in FIG. 2, in one embodiment, is a general-purpose computing device that provides content. A bus 270 is a communication medium that provides a data connection for processor 275, data storage device 280 (such as a Serial ATA (SATA) hard disk drive, optical drive, Small Computer System Interface (SCSI) disk, or the like), communication interface 285, memory 290 (such as Random Access Memory (RAM), Dynamic RAM (DRAM), or the like), and content library 142. The communication interface 285 transmits and receives data between the content server 140 and the VOD server 100 via the distribution network 130.

The processor 275 executes the sequences of operational instructions that comprise each computer program resident in, or operative on, the memory 290. The reader should understand that the memory 290 may include operating system, administrative, and database programs that support the programs disclosed in this application. In one embodiment, the configuration of the memory 290 of the content server 140 includes a VOD server program 291. The VOD server program 291 communicates with the content caching program 223 on the VOD server 100 to perform the method of hierarchical caching disclosed in detail in FIG. 3. The VOD server program 291 receives requests for the media content 144 from the VOD server 100 and sends the media content 144 to the VOD server 100 in response to those requests. When the content caching program 223 performs hierarchical caching, results are stored in the memory 290 or data storage device 280. In another embodiment, the memory 290 may swap these programs, or portions thereof, in and out of the memory 290 as needed, and thus may include fewer than all of these programs at any one time.

Figure 3:
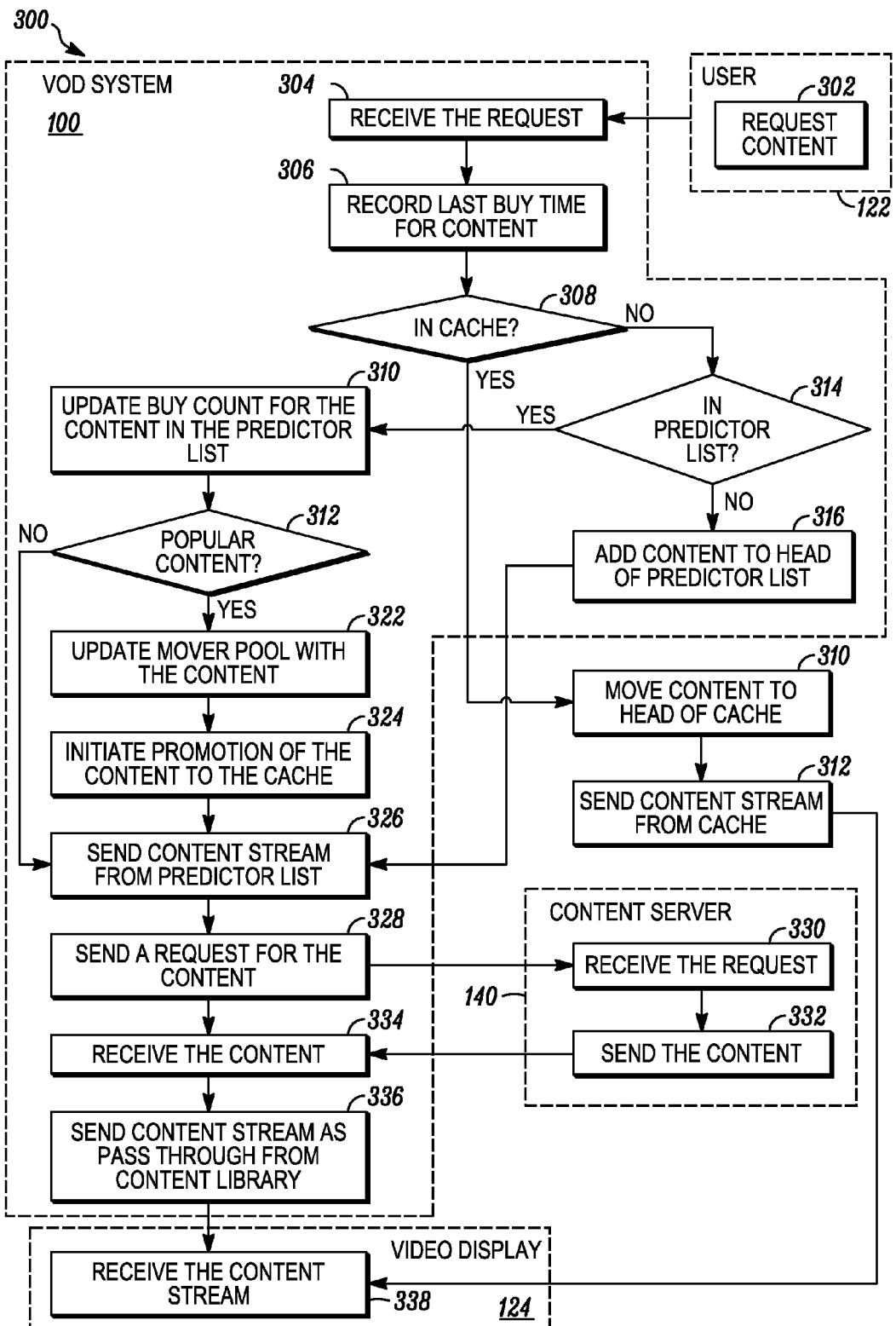
FIG. 3 is a flow diagram that illustrates a method for hierarchical caching of media content.

FIG. 3, with reference to FIG. 1 and FIG. 2, illustrates a user, by way of input device 250, operating a user device 120 to send a request to the VOD server 100 to stream media content 144 on the video display 124.

The process 300 shown in FIG. 3 begins when a user 122 decides to view a media presentation stored in a content library 142. The user 122, by way of input device 250 and communication interface 245, sends a request to a VOD server 100 (step 302). The request is to display the media presentation on the video display 124. The VOD server 100 receives the request (step 304), records the buy time for the media presentation (step 306), and determines whether the media presentation (i.e., the media files in which the media presentation is digitized) is stored in the cache 210 (step 308). If the media presentation is stored in the cache 210 (step 308, Y branch), the VOD server 100 moves the media presentation to the head of the cache 210 (step 310), and sends the media presentation as a content stream to the video display 124 (step 312). The video display 124 receives the stream (step 338) from the VOD server 100 and displays it for the user, by way of video display 124.

If the media presentation is not stored in the cache 210 (step 308, N branch), the VOD server 100 examines the predictor list 221 in the memory 220 to determine whether the media presentation is in the predictor list 221 (step 314). If the media presentation is in predictor list 221 (step 314, Y branch), the VOD server 100 updates the buy count for the entry in the predictor list 221 that corresponds to the media presentation (step 318). The VOD server 100 then examines the usage patterns (purchase times and viewing durations) for the media presentation to determine whether the media presentation is popular (step 320). If the media presentation is popular (step 320, Y branch), the VOD system updates the mover pool 222 with the media presentation (step 322), when a mover element is available, to initiate promotion of the media presentation to the cache 210 (step 324). The VOD server 100 then sends the media presentation as a content stream to the video display 124 (step 326) by sending a request for the media presentation (step 328) to the content server 140. The content server 140 receives the request (step 330), retrieves the media presentation from the content library 142, and sends the media presentation to the VOD server 100 (step 332). The VOD server 100 receives the media presentation (step 334), and sends the media presentation from the content server 140 (as a content stream) to the video display 124 (step 338). The video display 124 receives the content stream (step 338) from the VOD server 100 and displays it for the user 122.

If the media presentation is not in predictor list 221 (step 314, N branch), the VOD server 100 adds the media presentation to the head of the predictor list 221 and updates the buy count value for the reference entry in the predictor list 221 that corresponds to the media presentation (step 318). The VOD server 100 then sends the media presentation as a content stream to the video display 124 (step 326) by sending a request for the media presentation (step 328) to the content server 140. The content server 140 receives the request (step 330), retrieves the media presentation from the content library 142, and sends the media presentation to the VOD server 100 (step 332). The VOD server 100 receives the media presentation (step 334, and sends the media presentation as pass through from the content server 140 to the video display 124 (step 338). The video display 124 receives the content stream (step 338) from the VOD server 100 and displays it for the user.

In one embodiment of the process 300 shown in FIG. 3, the VOD server 100 predictively caches media presentations (i.e., the media files for the presentations) based on customer usage patterns in a way that minimizes the churn rate of the cache 210, especially when the cache is implemented as flash memory, in order to reduce the possibility that the memory will fail. The process 300 uses a feedback loop to change the measurement interval of the popularity predictor in order to self-adjust to usage patterns and streams count.

The process 300 uses two LRU lists, the predictor list 221 and cache list 226, where the length of the first list (the predictor list 221) is adjusted by the oldest media presentation in the second list (the cache list 226). When media presentations are first purchased by the user, by way of input device 250, they are not moved into the cache list 226 immediately, but start out on the predictor list 221. Instead they are streamed directly from content server 140 until they are deemed to be popular enough to warrant promoting into the cache list 226. This may be done for a number of reasons. For example, the media presentation may be in the "long tail" of the usage curve, meaning that it is unlikely to be purchased again and this user will be the only one to watch it. If the media presentation were to be moved immediately into the cache list 226, it is likely that it would cause the removal of a more popular item. This adversely affects not just the efficiency of the cache list 226, but, if stored in flash memory, the wear out time of the flash memory. For long tail items, the media is directly streamed from the content server 140.

Generally, embodiments of the invention described herein provide a method that includes: providing, from a first server having a first cache therein, a first media presentation to a first group of user devices and a second media presentation to a second group of user devices; providing, from a second server having a second cache therein, a third content to a third group of user devices; measuring, via a controller, a first popularity corresponding to the first media presentation; measuring, via the controller, a second popularity corresponding to the second media presentation; storing a copy of the first media presentation on the second cache based on the first popularity and the second popularity; determining, via the controller, when the first server fails to continue to provide the first media presentation to the first group of users devices; and providing, from the second server, the first media presentation to the first group of user devices based on said determining, wherein the first cache has the first media presentation stored therein, and wherein the second cache has the second media presentation stored therein.

Other embodiments provide a method that includes: providing, from a first server having a first cache therein, a first media presentation to a first group of user devices; providing, from a second server having a second cache therein, a second media presentation to a second group of user devices; providing, from a third server having a third cache therein, a third content to a third group of user devices; measuring, via a controller, a first popularity corresponding to the first media presentation; measuring, via the controller, a second popularity corresponding to the third content; storing a copy of the first media presentation on the second cache based on the first popularity and the second popularity; determining, via the controller, when the first server fails to continue to provide the first media presentation to the first group of users devices; and providing, from the second server, the first media presentation to the first group of user devices based on said determining, wherein the first cache has the first media presentation stored therein, and wherein the second cache has the second media presentation stored therein.

Embodiments are drawn to at least one of two aspects. The first aspect deals with master caching, whereas the second aspect deals with shadow streams.

The idea for master caching is to measure the popularity of all the contents that are in use across an entire cluster of VOD servers. Then, a caching process similar to that is used at the VOD server level, is used on the entire cluster level. However, instead of the decision being to make a "local copy" of the content, a duplicate copy of the content is made on another VOD server in the cluster when the content is declared popular using "peer-to-peer" techniques. This content takes space on that other VOD server, but is marked as unremovable such that it is available in case of a failure of the primary VOD server. In some embodiments, if the popularity later drops, then a flag is cleared and the duplicate may be removed. By analyzing the usage patterns and setting the size of the master cache correctly, a method as disclosed herein can protect 80% of the streams for around a 2% decrease in hit rate of given current configurations.

The other aspect has to do with setting up shadow streams. One operation for a VOD server failure includes recreating the streams that were running on the failed VOD server on a remaining server. In accordance with embodiments disclosed herein, a shadow stream is created for every stream that has backup content when the stream is created. The shadow stream is established in manner similar to a regular stream, but does not provide the content until needed. So when a VOD server failure happens, the start point for the play operation is computed and is issued to the shadow stream on a functioning VOD server in the cluster, which is a much faster operation. In some embodiments, for streams that do not have duplicate contents, no shadow streams are configured so they would need to be recreated from scratch. However, due to the 80% protection provided by the duplicates based upon popularity, this is an acceptable server load and all the streams can get restarted quickly.

In some embodiments, shadow contents are stored for the most popular contents per VOD server. This will be further described with reference to FIGS. 4-7.

Figure 4:
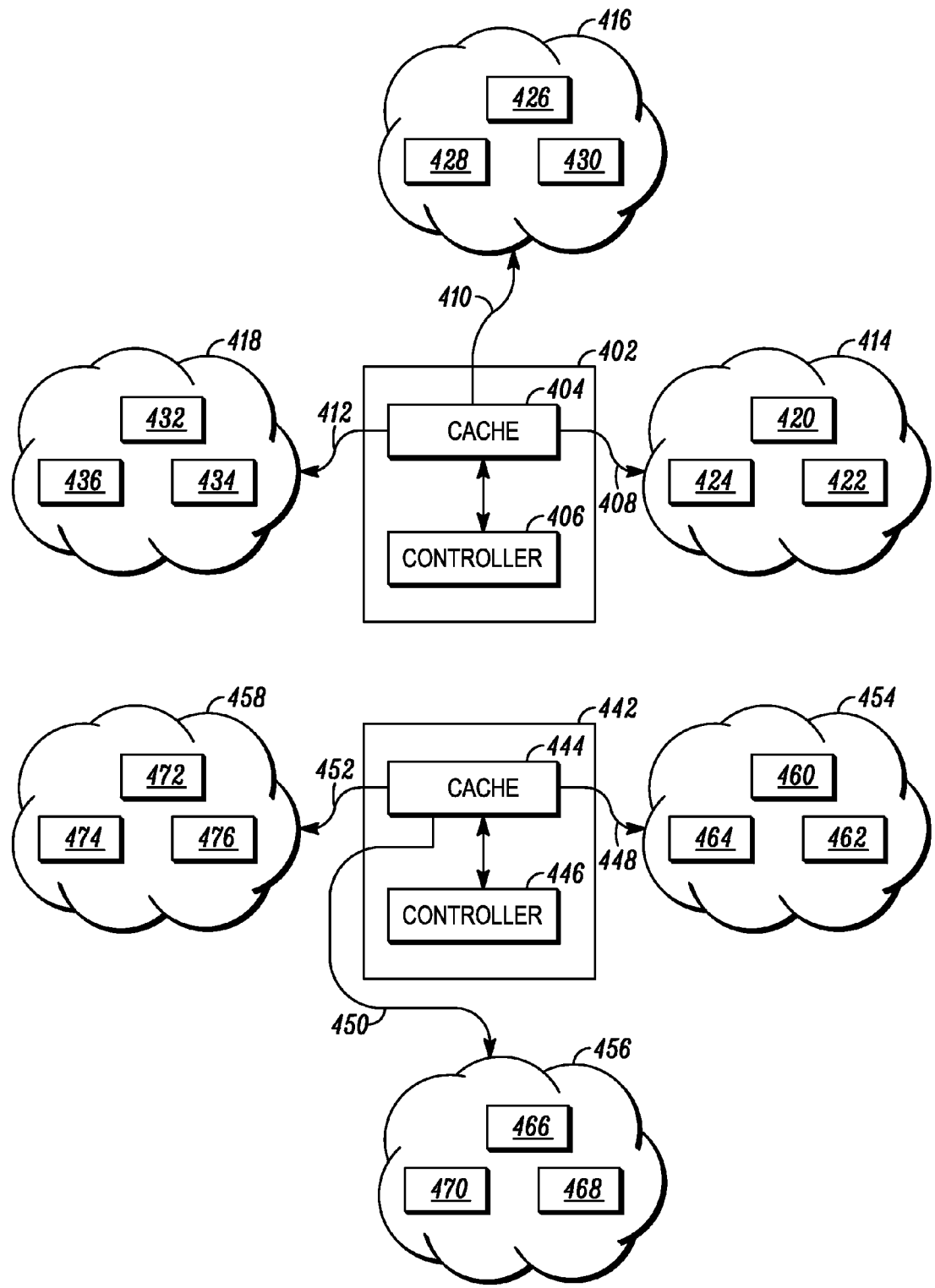
FIG. 4 illustrates a cluster of VOD servers providing media content to user devices.

Referring to FIG. 4, a VOD system 400 includes a cluster of VOD servers, including VOD servers 402 and 442. The VOD system 400 further includes groups 414, 416, 418, 454, 456 and 458 of user devices. VOD server 402 includes cache 404 and controller 406, and VOD server 442 includes cache 444 and controller 446. Group 414 includes user devices 420-424, group 416 includes user devices 426-430, group 418 includes user devices 432-436, group 454 includes user devices 460-464, group 456 includes user devices 466-470 and group 458 includes user devices 472-476. In an embodiment, the VOD servers 402 and 442 have the same hardware configuration as the VOD server 100 of FIG. 1.

The cache 404 of VOD server 402 bidirectionally communicates with controller 406. Similarly, cache 444 bidirectionally communicates with controller 446. Cache 404 and cache 444 are components that are operable to store data so that future requests for that data can be fulfilled faster. Cache 404 and cache 444 store media files of media content, which the VOD servers 404 and 442 can stream to one or more of the user devices. As noted above, such media files make up media presentations. User generally request specific media presentations. Cache 404 and cache 444 may be implemented as described for the cache 225.

Controller 406 controls the functions of the VOD server 402, including processing requests, received from one or more user devices, for media presentations. Such requests are often generated by the users of these devices. In processing the requests, the controller 406 makes determinations regarding storage, caching, and streaming of the media presentations based on the data received. Controller 446 performs the same functions for VOD server 442.

Groups 414, 416, 418, 454, 456 and 458 are groups of user devices that are capable of receiving media content via VOD servers 402 and 442. Each group may receive different media content than other groups. For example, group 414 may receive different media content than group 416, which receives different content from group 418.

Referring still to FIG. 4, it is assumed for the sake of discussion that the VOD server 402 is providing content streams 408, 410, and 412 to groups 414, 416, and 418 respectively. Similarly the VOD server 442 is providing content streams 448, 450 and 452 to groups 454, 456, and 458 respectively.

Content streams 408, 410, 412, 448, 450 and 452 are each a stream of content that may include any type of media presentation movie, a television show, advertisement, or any other type of media that a consumer may wish to purchase. Content stream 408 is shown as a single stream. In actuality, each user device within group 414 receives its own content stream. In this example, since each of user device 420, user device 422 and user device 424 are receiving the same content, content stream 408 is shown as being provided to group 454 to simplify the figure. Similarly, content stream 410 to group 416 is actually three separate content streams to each of user device 426, user device 428 and user device 430; content stream 412 to group 418 is actually three separate content streams to each of user device 324, user device 434 and user device 436; content stream 448 to group 454 is actually three separate content streams to each of user device 460, user device 462 and user device 464; content stream 450 to group 456 is actually three separate content streams to each of user device 466, user device 470 and user device 456; and content stream 452 is actually three separate content streams to each of user device 472, user device 474 and user device 476.

User devices 420-436 and 460-476 are devices used to view content. User devices 420-436 and 460-476 may include televisions, desktop computers, laptop computers, tablet computers, mobile phones, or any other device capable of displaying video content or storing video content for future viewing.

In operation, VOD server 402 may receive requests from user devices 420-424 for media content. If the VOD server grants the request, it will set up a content stream and transmit data of media files (which are stored in the cache 444). VOD server 442 operates in the same manner.

According to an embodiment of the invention, the controller 406 determines the popularity of media presentations in a manner similar to that described above in conjunction with FIGS. 1-3. However, instead of determining popularity on a user device by user device basis, the controller determines of popularity based on the aggregate purchasing and viewing patterns of all groups and video devices in communication with VOD servers 402 and 442, not at the level of individual video devices. Popular media presentations are stored in within cache 404 for quick retrieval when required.

In the case of FIG. 4, it will be assumed that the media presentations provided via content streams 408, 410, 412, 448, 450 and 452 are all determined to be popular, so the previous description of how the content as provided by content stream 408 is provided to user devices 420-424 is applicable to the media content as provided by content streams 410, 412, 448, 450 and 452 as well.

Generally speaking, the process of providing content includes: establishing a stream; and then feeding the content by way of the established stream. To streamline a content backup system, at least one shadow stream is created for each stream of content being provided. In this manner the processing time is invested at the beginning, as opposed to when the stream might be needed such as when a VOD server crashes. This will be further described with reference to 5.

Figure 5:
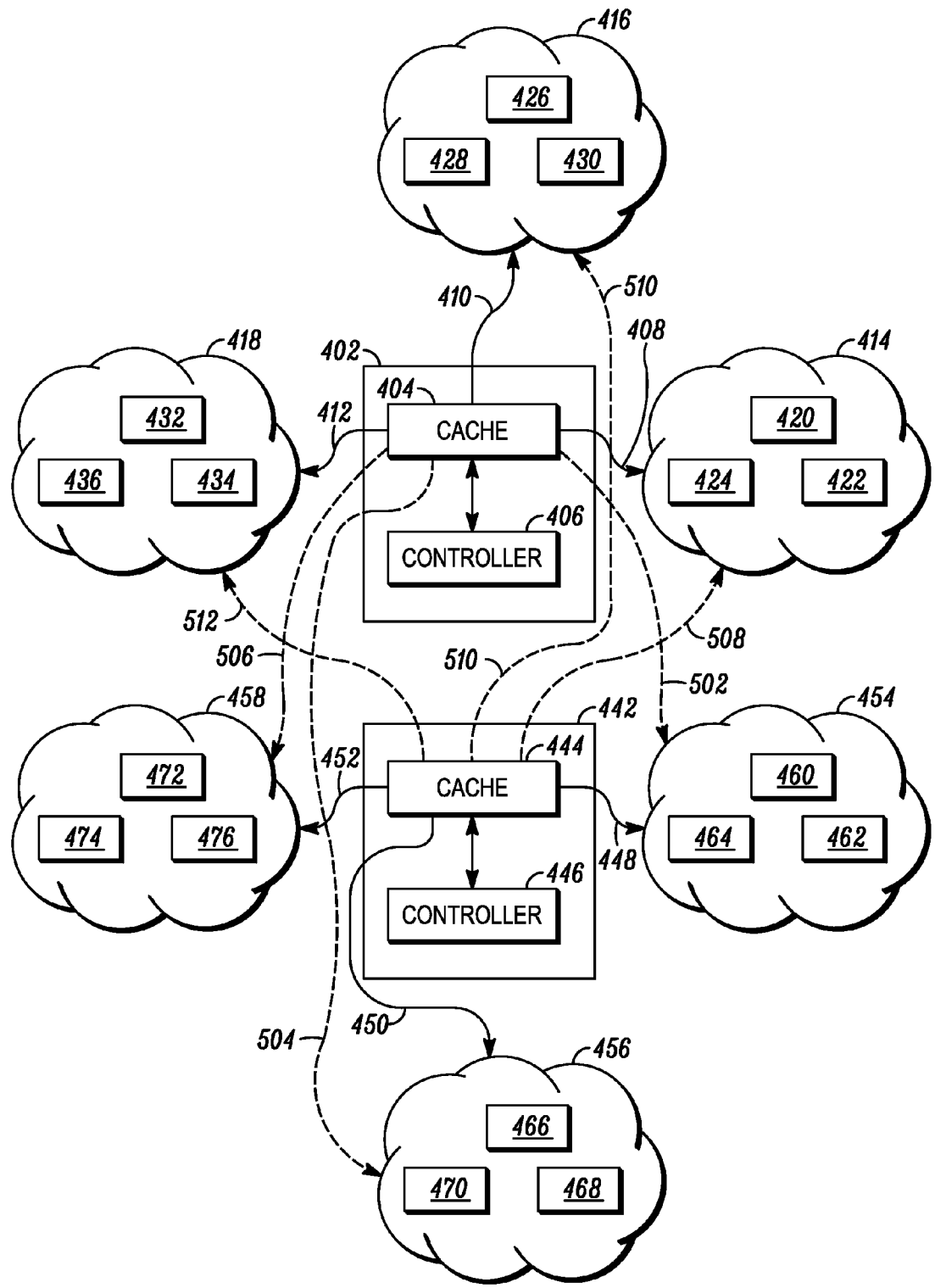
FIG. 5 illustrates a cluster of VOD servers generating shadow streams.

FIG. 5 illustrates a system of VOD servers generating shadow streams.

As shown in the figure, system 500 includes the VOD servers 402 and 442. The VOD servers 402 and 442 have set up shadow streams 502-512 to groups 414, 416, 418, 454, 456, and 458. Shadow stream 502 corresponds to content stream 448. As such, if VOD server 442 were to stop providing content stream 448 to group 454, e.g., VOD server 442 crashes, then established shadow stream 502 may enable VOD server 402 to provide content as previously provided by content stream 448 to group 454. Similarly, shadow stream 504 corresponds to content stream 450, shadow stream 506 corresponds to content stream 452, shadow stream 508 corresponds to content stream 408, shadow stream 510 corresponds to content stream 410 and shadow stream 512 corresponds to content stream 412.

Shadow streams 502-512 are streams that the VOD servers 402 and 442 set up to, if needed, provide content to groups 414-418 and 454-458. Such setting up may include establishing state information and passing the state information to the groups of user devices. The state information may include buffer locations, identifiers, logical portions source files, etc. Shadow streams 502-512 are not active streams because they are not currently providing content to any of groups 414-418 or 454-458. Essentially, the VOD servers set up shadow streams 502-512 to in case service is interrupted on the primary VOD servers. If such interruption occurs, the VOD servers may then begin streaming media content to the groups of user devices using the state information of the shadow streams.

In operation, the ordering and viewing of media content as provided by content streams 408-412 and 448-452 is analyzed by controllers 406 and 446. For purposes of discussion, assume that content as provided by content streams 408-412 and 448-452 has been deemed popular enough to store on caches 404 and 444, respectively. Further assume that VOD server 402 is the primary server for content as provided by content streams 408-412 and VOD server 442 is the primary server for content as provided by content streams 448-452.

In the event that either VOD server 404 or 444 fails to provide the desired content stored within caches 404 or 444, respectively, it is desirable for the user to experience as little service interruption as possible while an alternate server begins to provide the desired content.

To prepare for such a situation, popular content stored on a VOD server cache may also be stored on an alternate VOD server cache as well, to allow for quick changeover. For example, and as previously described, assume that the content as provided by content stream 448 has been deemed to be popular and is stored in cache 444 of VOD server 442. Due to the popularity of the content as provided by content stream 448, though, the content as provided by content stream 448 may also be stored on cache 404 of VOD server 402. Shadow stream 502 is established from cache 404 to provide group 454 with a relatively seamless transition from VOD server 442 to VOD server 402 in the event of a service interruption with VOD server 442.

It can be appreciated that, though the example provided with reference to FIG. 5 focused on only two VOD servers, the description would apply to any number of servers providing content to users. The description above is meant to highlight, in general, how a system of shadow streams is established, not to limit the number of VOD servers or shadow streams provided.

Figure 6A:
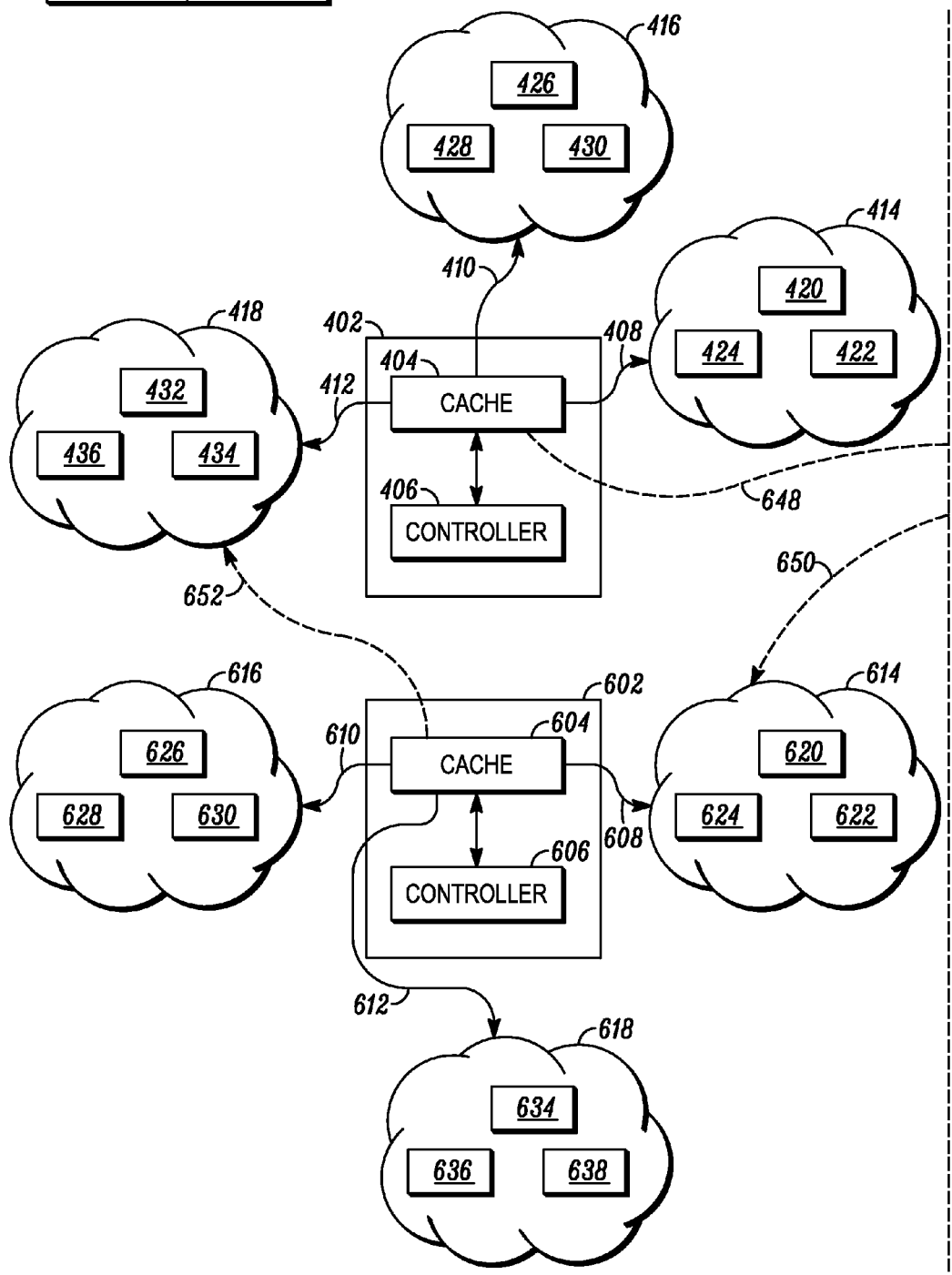
FIG. 6 illustrates a cluster of VOD servers generating shadow streams.
Figure 6B:
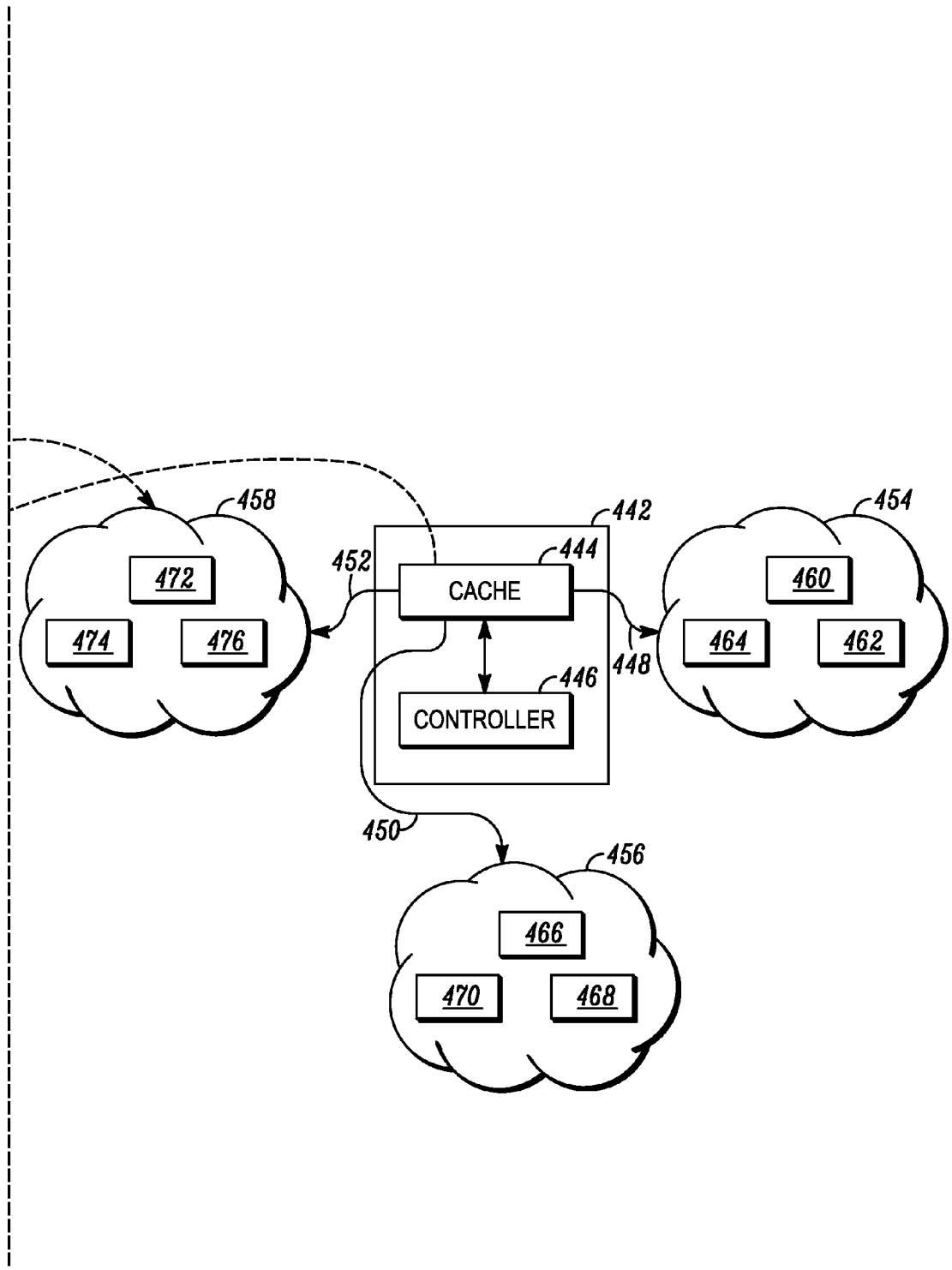

FIG. 6 illustrates a system of VOD servers generating shadow streams.

As shown in the figure, system 600 includes all of the VOD servers, caches, controllers, groups, users and content streams shown in FIG. 5, In addition, system 600 includes VOD server 602, cache 604, controller 606, content streams 608-612, groups 614-618, user devices 620-636 and shadow streams 648-652.

In previous example scenarios, it was assumed that all content being provided to different groups was determined to be popular by the VOD server controllers. In this example scenario, only a few select contents are popular. For example, in this case controller 406 has determined that content as provided by content stream 412 is popular, controller 446 has determined that content as provided by content stream 448 is popular, and controller 606 has determined that content as provided by content stream 614 is popular. Popularity of each piece of content may be determined by using a method similar to that discussed with reference to FIGS. 1-3.

The popular content may then be stored on an alternate VOD server in case the primary server fails to provide the desired content. In this example, content as provided by content stream 448 is stored on cache 404 of VOD server 402, content as provided by content stream 608 is stored on cache 444 of VOD server 442 and content as provided by content stream 412 is stored on cache 604 of VOD server 602.

In order to make the transition from the primary VOD server to the alternate VOD server as seamless as possible in the event of a service interruption, shadow streams of the cached content on the alternate servers are created as discussed with reference to FIG. 5. Shadow stream 648 is established for content stream 448, shadow stream 650 is established for content stream 608 and shadow stream 652 is established for content stream 412. The shadow streams do not actively provide content to the user devices, but they are established such that any transition between the active content streams and the shadow streams will provide a substantially seamless transition for the users.

It can be appreciated that, with multiple VOD servers within a network, it may be possible to have more than one shadow stream established from more than one alternate VOD server for content determined to be popular. The example discussed with reference to FIG. 6 used a single alternate VOD server with a single shadow stream for each piece of popular content, however in some embodiments there may be numerous shadow streams established for a single piece of content to provide multiple alternate VOD servers.

In some embodiments, popularity may be measured with respect to a single VOD server. For example, the popularity of contents as provided by content streams 408, 410 and 412 may be compared to one another to determine which of contents as provided by content streams 408, 410 and 412 should be stored in another VOD server as a backup.

In some embodiments, popularity may be measured with respect to all VOD servers. For example, the popularity of contents as provided by content streams 408, 410, 412, 448, 450, 452, 608, 610 and 612 may be compared to one another to determine which of all the contents should be stored in another VOD server as a backup. In such a case, there is a possibility that all the contents provided by some VOD servers may not be stored in another VOD server for a backup. Further, in such a case, there is a possibility that all the contents provided by some VOD servers may be stored in other VOD servers for backup.

Figure 7:
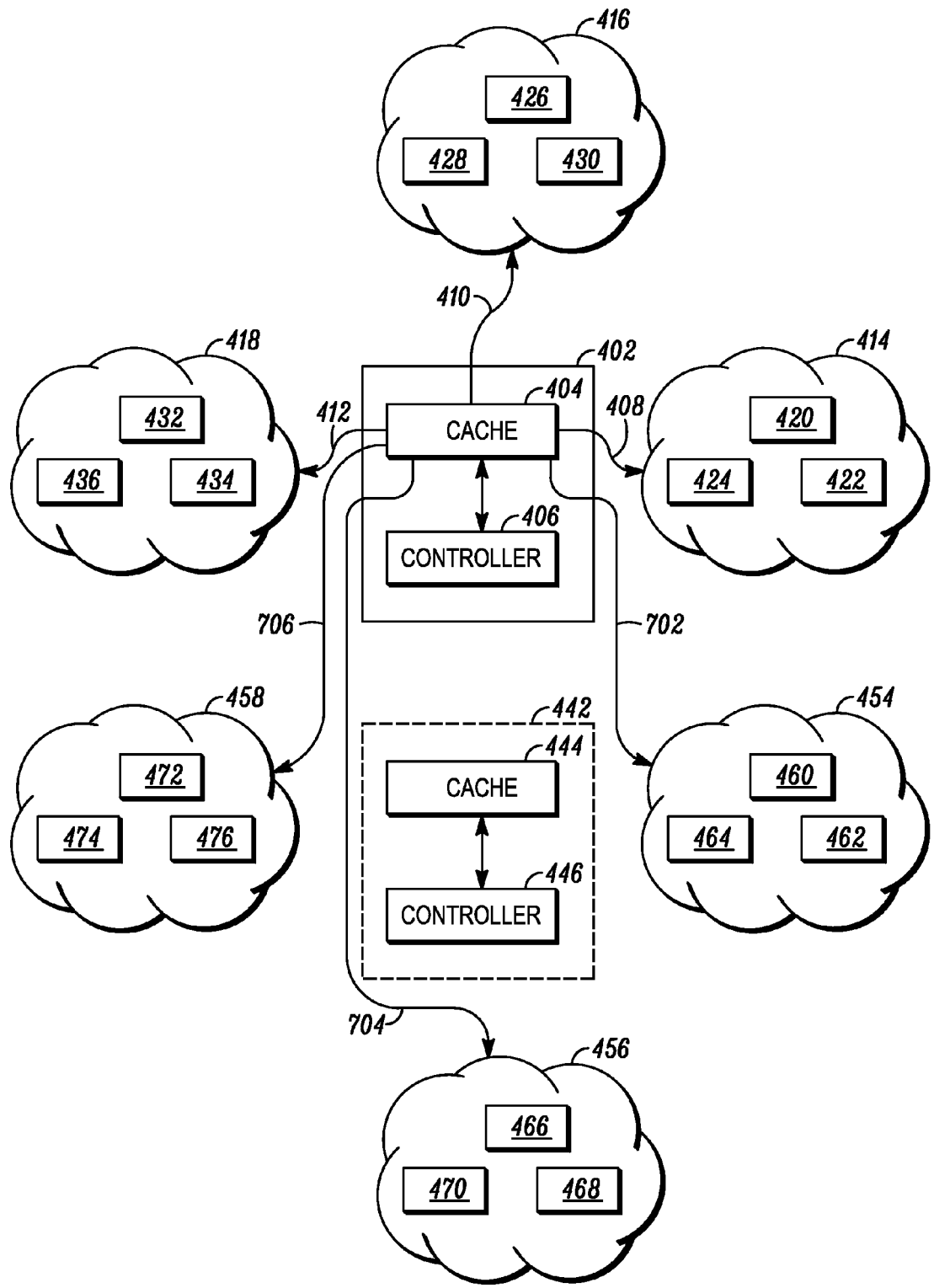
FIG. 7 illustrates a VOD server providing media content to additional user devices in response to failure of another VOD server.

FIG. 7 illustrates a VOD server providing content to additional user devices in response to failure of another VOD server.

As shown in the figure, content streams 702, 704 and 706 include the contents being provided to groups 454-458, respectively. Content streams 702, 704 and 706 correspond to shadow streams 502, 504 and 506, respectively, as discussed above with reference to FIG. 5. Content streams 702, 704 and 706 are each a stream of content that may be a movie, a television show, advertisement, or any other type of media that a consumer may wish to purchase. In actuality, each user device within group 454 receives its own content stream. In this example, since each of user device 460, user device 462 and user device 464 are receiving the same content, content stream 702 is shown as being provided to group 454 to simplify the figure. Similarly, content stream 704 to group 456 is actually three separate content streams to each of user device 466, user device 470 and user device 456 and content stream 706 is actually three separate content streams to each of user device 472, user device 474 and user device 476.

In this example scenario, VOD server 442 has failed to provide content to groups 454-458 that it was previously providing. The failure is indicated by the dotted line instead of a solid line for VOD server 442. As discussed with reference to FIG. 5, shadow streams 502-506 were established for this scenario.

When VOD server 442 fails to provide content, controller 446 may notify controller 406 that an issue has been encountered and it is no longer able to provide the desired content. Alternatively, the message from controller 446 may be routed through a content server (not shown) that provides content to VOD servers 402 and 442.

The message from controller 446 includes information regarding the estimated viewing position and the last known state of the content for each of user devices 460-476. The estimated viewing position provides an approximate position within the content at which it should be restarted for each user device. For example, each device may provide status information to the VOD server from which the device is receiving content. This status information may be provided periodically, e.g., predetermined periods, or at specified events, e.g., when a play, pause, rewind or fast forward command is executed.

For example, consider the case where user device 460 may have pressed the play button 15 minutes prior to the service interruption. For purposes of discussion, in this example, presume that user device 460 had provided status information to controller 446 when the play button was pressed. In some embodiments, the status information may include the point within the content that is being played. In some embodiments, the status information may include the state of user device 460. In some embodiments, the status information may include a combination of the point within the content that is being played and the state of user device 460.

With the status information, controller 446 may determine a viewing position of user device 460 at any time. As controller 446 received additional status information from user device 460, the viewing position and state of user device 460 is constantly monitored. This status information may be communicated to controller 406. As such, if VOD server 442 is unable to continue to provide content to user device 460, controller 406 may easily determine the viewing position and the state of user device 460 in order to provide a relatively seamless continuation of the content.

In other words, controller 446 would provide that data such that, when service is restarted using alternate VOD server 402, the provided content provided by VOD server 402 may start in approximately the same viewing position as when service was interrupted. With respect to the state of user device 460 at the time of the service interruption, consider the situation where user device 460 may have been in the middle of rewinding the content. This information is important because, when service is restarted from VOD server 402, user device 460 can simply continue to rewind with minimal service interruption.

With reference to FIG. 5, shadow streams 502-506 were established for content streams 448-452, respectively, in order to provide a relatively seamless transition in the case of a service interruption. Controller 406 of VOD server 402 receives information regarding the estimated viewing position and last known state of contents as provided by content streams 448-452 for all user devices within groups 454-458.

Returning to FIG. 7, once all the information is known by controller 406, the information is passed to cache 404 and shadow streams 502-506 are activated to provide content streams 702, 704 and 706 to groups 454-458, respectively. Content streams 702, 704 and 706 are equivalent to content streams 448-452 and are provided such that any interruptions in service would be very minor to the end customer, and the transition between the original content delivery and the alternate content delivery is as seamless as possible.

There may be situations where a particular content is not stored at a VOD server as a backup, in the event another VOD server fails to continue to provide the particular content. In such cases, the backup VOD server may need to retrieve the content from upstream at the content provider. This will be described in greater detail with reference to FIG. 8.

Figure 8:
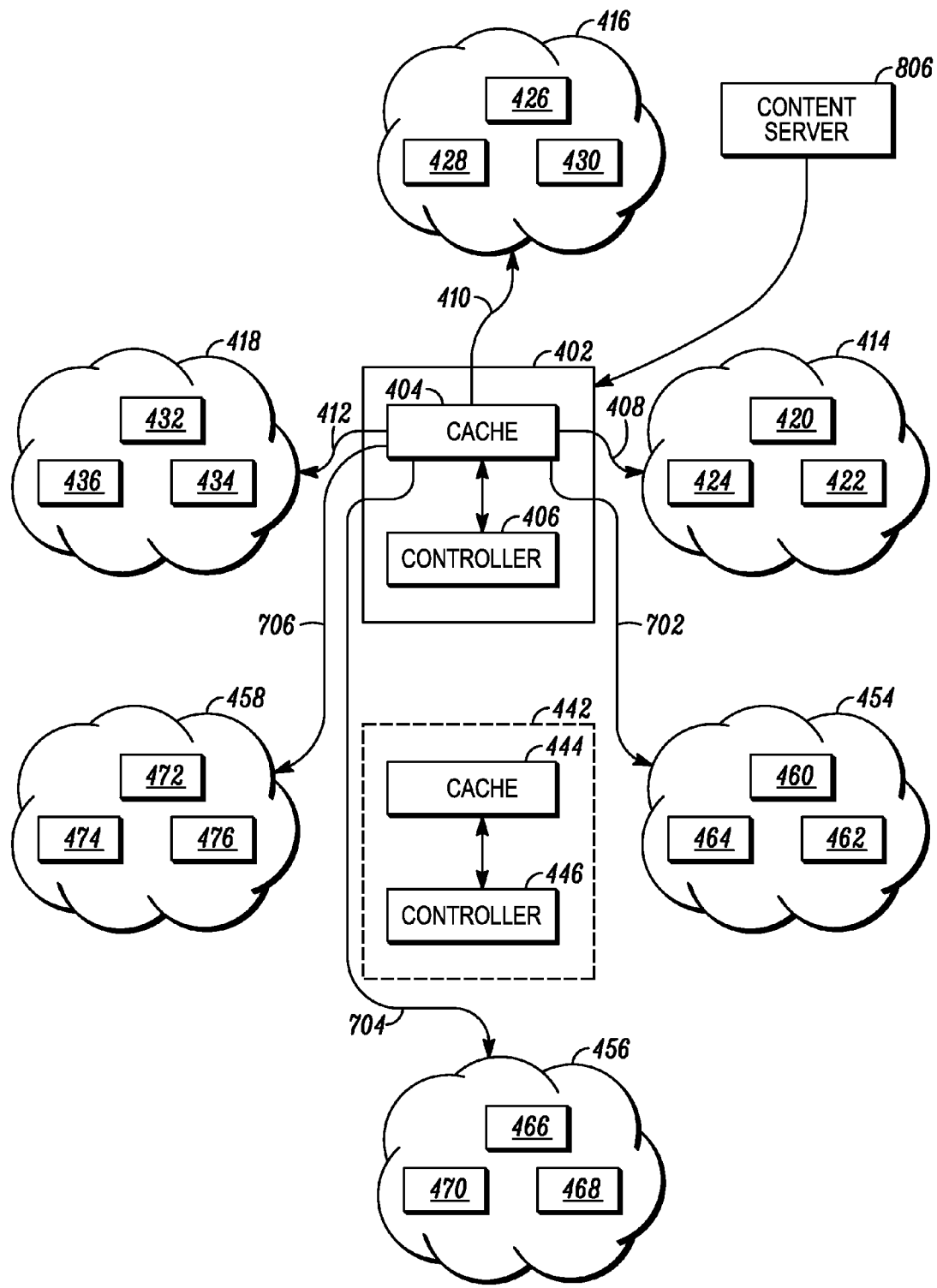
FIG. 8 illustrates a media content server providing media content to user devices in response to failure of a VOD server.

FIG. 8 illustrates a content server providing content to user devices in response to failure of a VOD server.

As shown in the figure, content server 806 provides content by way of content stream 802 to VOD server 402, which then provides the content of content stream 802 to group 454 without storing the content of content stream 802 in cache 404.

Content server 806 is the server from which all content originates and is provided to a network of VOD servers, of which VOD servers 402 and 442 are a part. Due to the amount of data transmitted by the server, content server 806 typically requires large amounts of RAM or a powerful, multicore central processing unit (CPU).

Previous descriptions have focused on content that has been deemed popular, however there may be many cases in which the content being viewed is not considered popular, and therefore may not be stored within the cache of the VOD server.

In this example, presume that the content being viewed by user devices 460-464 of group 454 has not been deemed popular, and therefore a copy of the content was not stored on cache 444 of VOD server 442, which was the primary server for the content prior to experiencing a service interruption.

Even though the content was not popular, it is desirable to create a shadow stream in order to create a relatively seamless transition in case of a service interruption. Since the content is not popular and is not stored in a cache, the shadow stream may originate from content server 806, upstream from VOD servers 402 and 442.

As was the case with reference to FIG. 7, controller 446 maintains information regarding the approximate viewing position and last known state for the content, and that information is provided to controller 406, either directly or via content server 806.

Returning to FIG. 8, once all the information is known by controller 406, the information is applied to content 802 such that the user devices within group 454 experience a relatively seamless transition between the original content delivery and the alternate content delivery.

It may be noted that alternate content delivery coming from a cached version of the content may require less time to resume service than alternate content coming from the content server, however the shadow streams generated in either case may dramatically decrease the time required to resume service in comparison to a system in which no shadow streams had been generated at all.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated.

The invention claimed is:

1. A method comprising:
providing, from a first server, a first media presentation to a first group of user devices;
storing the first media presentation in a first server cache using hierarchical caching based on popularity of the first media presentation;
storing a copy of the first media presentation on a second server based on the popularity of the first media presentation;
creating, when the first media presentation to the first group of user devices is provided, a shadow stream of the first media presentation from the second server to the first group of user devices, creating the shadow stream comprising establishing state information for the shadow stream, wherein the created shadow stream is inactive and does not provide the first media presentation until activated;
determining, via a controller, if the first server fails to continue to provide the first media presentation to the first group of user devices; and
responsive to determining that the first server failed to continue to provide the first media presentation to the first group of user devices, activating the shadow stream using the state information to provide the first media presentation, from the second server, to the first group of user devices.

2. The method of claim 1, further comprising:
determining, via the controller, points within the first media presentation, for each device of the first group of user devices at which the first server failed to continue to provide the first media presentation to the first group of user devices,
wherein activating the shadow stream using the state information to provide the first media presentation, from the second server, to the first group of user devices comprises providing the first media presentation to the first group of user devices such that each device of the first group of user devices may resume at the points within the first media presentation at which the first server failed to continue to provide the first media presentation to the first group of user devices.

3. The method of claim 2, wherein determining, via the controller, the points within the first media presentation, for each device of the first group of user devices at which the first server failed to continue to provide the first media presentation to the first group of user devices comprises:
receiving status information from each device of the first group of user devices corresponding to a status of the first media presentation in a first time period prior to a time at which the first server failed to continue to provide the first media presentation to the first group of user devices and calculating the points within the first media presentation, for each device of the first group of user devices at which the first server failed to continue to provide the first media presentation to the first group of user devices based on the status information and the time at which the first server failed to continue to provide the first media presentation to the first group of user devices.

4. The method of claim 3, further comprising:
determining, via the controller, a state of each device of the first group of user devices at which the first server failed to continue to provide the first media presentation to the first group of user devices,
wherein activating the shadow stream using the state information to provide the first media presentation, from the second server, to the first group of user devices comprises providing the first media presentation to the first group of user devices such that each device of the first group of user devices may resume at the state within the first media presentation at which the first server failed to continue to provide the first media presentation to the first group of user devices.

5. The method of claim 2, further comprising:
determining, via the controller, a state of each device of the first group of user devices at which the first server failed to continue to provide the first media presentation to the first group of user devices, wherein activating the shadow stream using the state information to provide the first media presentation, from the second server, to the first group of user devices comprises providing the first media presentation to the first group of user devices such that each device of the first group of user devices may resume at the state within the first media presentation at which the first server failed to continue to provide the first media presentation to the first group of user devices.

6. The method of claim 1, further comprising:

determining, via the controller, a state of each device of the first group of user devices at which the first server failed to continue to provide the first media presentation to the first group of user devices, wherein activating the shadow stream using the state information to provide the first media presentation, from the second server to the first group of user devices, comprises providing the first media presentation to the first group of user devices such that each device of the first group of user devices may resume at the state within the first media presentation at which the first server failed to continue to provide the first media presentation to the first group of user devices.

7. The method of claim 1, wherein a hierarchical caching position of the first media presentation among media at the first server is further based on a number of devices in the first group of user devices.

8. The method of claim 1, wherein a hierarchical caching position of the first media presentation among media at the first server is based on a percentage of the first media presentation that has been viewed by the devices in the first group of user devices.

9. The method of claim 1, wherein the first media presentation is provided from the first server using a first stream and activating the shadow stream using the state information comprises:

recreating the first stream using a second stream from the second server to the first group of user devices containing the first media presentation.

10. The method of claim 1, wherein the first media presentation is provided from the first server using a stream and creating the shadow stream comprises:

creating the shadow stream when the stream providing the first media presentation from the first server is created.

11. The method of claim 1, wherein the copy of the first media presentation is stored on a plurality of other servers and creating the shadow stream comprises:

establishing a plurality of shadow streams of the first media presentation from the plurality of other servers to the first group of user devices when the stream providing the first media presentation from the first server is created.

12. The method of claim 1, further comprising:

maintaining, using a controller associated with the first server, information regarding a viewing position and last known state of the first media presentation provided to the first group of user devices;

wherein activating the shadow stream comprises, providing by the controller associated with the first server to a controller associated with the second server, the information regarding the viewing position and last known state of the first media presentation; and wherein the controller associated with the first server causes the controller associated with the second server to provide the first media presentation to the first group of user devices starting from the viewing position and last known state when the shadow stream is activated.

13. The method of claim 1, wherein the first server and the second server are located within a same cluster of servers.

14. A video-on-demand system comprising:

a computer processor for executing computer program instructions; and a non-transitory computer readable medium storing computer program instructions executable by the processor to perform steps comprising:

providing, from a first server, a first media presentation to a first group of user devices;

storing the first media presentation in a first server cache using hierarchical caching based on popularity of the first media presentation;

storing a copy of the first media presentation on a second server based on the popularity of the first media presentation;

creating, when the first media presentation to the first group of user devices is provided, a shadow stream of the first media presentation from the second server to the first group of user devices, creating the shadow stream comprising establishing state information for the shadow stream, wherein the created shadow stream is inactive and does not provide the first media presentation until activated;

determining, via a controller, if the first server fails to continue to provide the first media presentation to the first group of user devices; and responsive to determining that the first server failed to continue to provide the first media presentation to the first group of user devices, activating the shadow stream using the state information to provide the first media presentation, from the second server, to the first group of user devices.

15. The system of claim 14, the steps further comprising:

determining, via the controller, points within the first media presentation, for each device of the first group of user devices at which the first server failed to continue to provide the first media presentation to the first group of user devices, wherein activating the shadow stream using the state information to provide the first media presentation, from the second server, to the first group of user devices comprises providing the first media presentation to the first group of user devices such that each device of the first group of user devices may resume at the points within the first media presentation at which the first server failed to continue to provide the first media presentation to the first group of user devices.

16. The system of claim 14, wherein the first media presentation is provided from the first server using a first stream and activating the shadow stream using the state information comprises:

recreating the first stream using a second stream from the second server to the first group of user devices containing the first media presentation.

17. The system of claim 14, wherein the first media presentation is provided from the first server using a stream and creating the shadow stream comprises:

creating the shadow stream when the stream providing the first media presentation from the first server is created.

18. The system of claim 14, wherein the copy of the first media presentation is stored on a plurality of other servers and creating the shadow stream comprises:

establishing a plurality of shadow streams of the first media presentation from the plurality of other servers to the first group of user devices when the stream providing the first media presentation from the first server is created.

19. The system of claim 14, further comprising:

maintaining, using a controller associated with the first server, information regarding a viewing position and last known state of the first media presentation provided to the first group of user devices;

wherein activating the shadow stream comprises, providing by the controller associated with the first server to a controller associated with the second server, the information regarding the viewing position and last known state of the first media presentation; and wherein the controller associated with the first server causes the controller associated with the second server to provide the first media presentation to the first group of user devices starting from the viewing position and last known state when the shadow stream is activated.

\* \* \* \* \*